(12) United States Patent
Chen et al.

(10) Patent No.: US 9,469,002 B2
(45) Date of Patent: Oct. 18, 2016

(54) CLAMPING DEVICE

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Jia-Chao Chen, Shenzhen (CN); Xiao-Bing Xu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 333 days.

(21) Appl. No.: 14/222,920

(22) Filed: Mar. 24, 2014

(65) Prior Publication Data
US 2014/0284860 A1    Sep. 25, 2014

(30) Foreign Application Priority Data

Mar. 25, 2013   (CN) .......................... 2013 1 00965077

(51) Int. Cl.
*B23Q 3/06*   (2006.01)
(52) U.S. Cl.
CPC .................... *B23Q 3/062* (2013.01)
(58) Field of Classification Search
CPC ..... B25B 1/2478; B25B 1/2489; B25B 1/06; B25B 1/08; B25B 5/04; B25B 5/02; B25B 5/101; B25B 5/082; B23Q 3/062
USPC ........................... 269/24, 33, 43, 45, 47, 156
See application file for complete search history.

(56) References Cited

U.S. PATENT DOCUMENTS

| 3,189,341 | A | * | 6/1965 | Maurus | ..................... B25B 5/08 269/153 |
| 4,598,453 | A | * | 7/1986 | Wills | ....................... B23Q 3/18 269/231 |
| 9,004,475 | B2 | * | 4/2015 | Xu | .......................... B23Q 3/06 269/254 R |
| 2013/0307205 | A1 | * | 11/2013 | Cardon-Dubois | ........ B25B 1/08 269/217 |

FOREIGN PATENT DOCUMENTS

| CN | 201109034 Y | * | 9/2008 | |
| EP | 1291027 A1 | * | 3/2003 | .......... A61M 5/1418 |

* cited by examiner

*Primary Examiner* — Joseph J Hail
*Assistant Examiner* — J Stephen Taylor
(74) *Attorney, Agent, or Firm* — Zhigang Ma

(57) ABSTRACT

Clamping device for clamping a workpiece defining at least three protection holes, includes a supporting seat, a pressing plate, a clamping assembly, and an operation assembly. The supporting seat can define a sliding groove, a first receiving groove, a second receiving groove, and a receiving hole, and includes a protrusion portion. The pressing plate can be securely stacked upon the supporting seat. The clamping assembly can include a first and a second clamping subassembly, and is sandwiched between the supporting seat and the pressing plate. The operation assembly can include a locking member and a transmission pin eccentrically assembled to an end of the locking member. When the locking member is rotated, the transmission pin can be driven to resist the second clamping subassembly to be partially exposed from the supporting seat, simultaneously. The locking member can resist the first subassembly to be partially exposed from the supporting seat.

19 Claims, 5 Drawing Sheets

US 9,469,002 B2

CLAMPING DEVICE

FIELD

The present disclosure relates to a clamping device, and more particularly, to a clamping device for clamping a workpiece defining a number of protection holes.

BACKGROUND

A workpiece may define many protection holes on a periphery. During machining, a clamping device may be employed to protect the protection holes, thereby avoiding damage to the protection holes. The clamping device includes a supporting seat, a first clamping assembly, a second clamping assembly, and a pressing plate. When in use, the workpiece is sleeved on the supporting seat, the first clamping assembly and the second clamping assembly is movably mounted on the supporting seat and tapped into corresponding protection holes. Then, the pressing plate is securely mounted on the supporting seat and presses the first clamping assembly and the second clamping assembly upon the supporting seat. When disassembling the clamping device from the workpiece, operators may disassemble the pressing plate from the supporting seat, and pull the first clamping assembly and the second clamping assembly from the protection holes. However, the pressing plate, the first clamping assembly and the second clamping assembly are disassembled from the supporting seat manually, which results in labor-consuming, complicated operations, and low efficiency.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
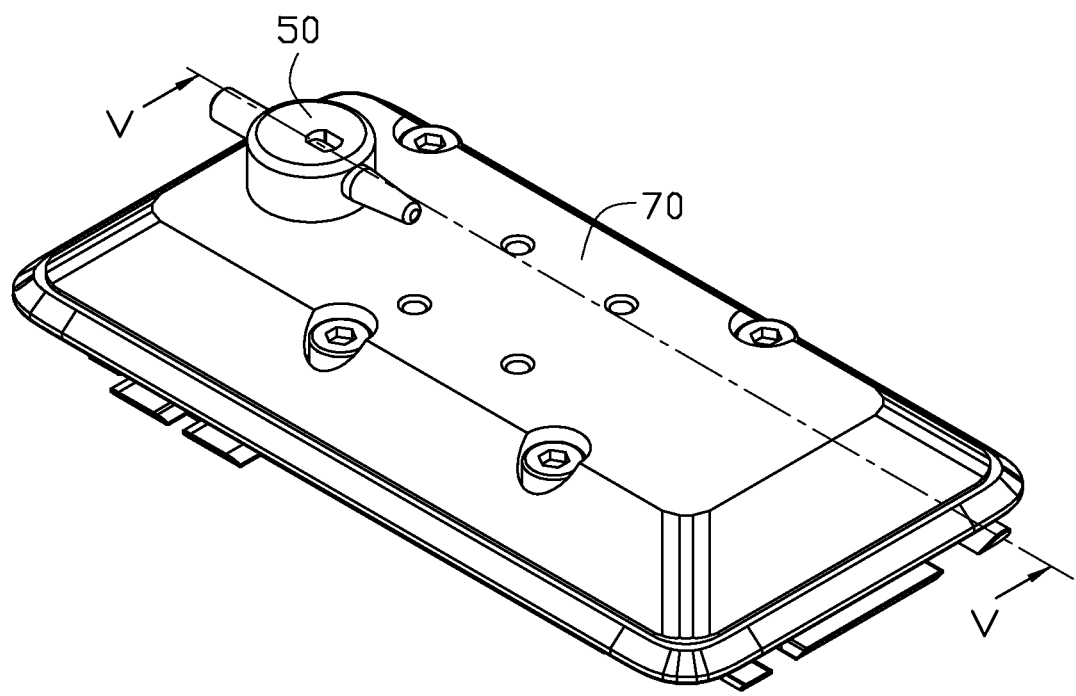
FIG. 1 is an isometric view of an embodiment of a clamping device in a use state.

FIG. 1 shows an embodiment of a clamping device 100. The clamping device 100 can be employed to protect a number of protection holes (not shown) defined on a workpiece (not shown). In the embodiment, the workpiece is substantially a rectangular bezel. The plurality of protection holes is defined on the periphery of the bezel and spaced from each other.

Figure 2:
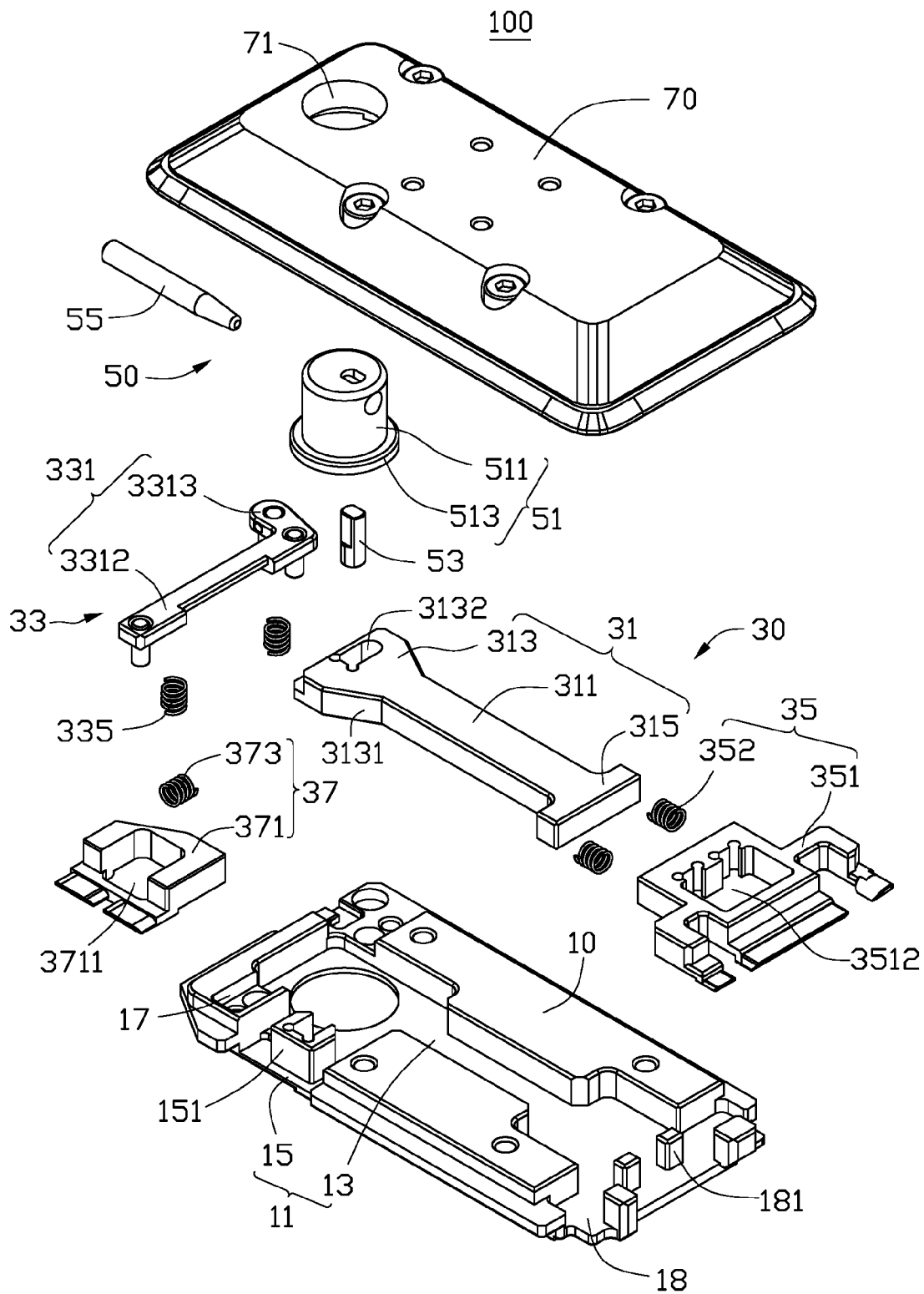
FIG. 2 is an exploded, isometric view of the clamping device of FIG. 1.
Figure 3:
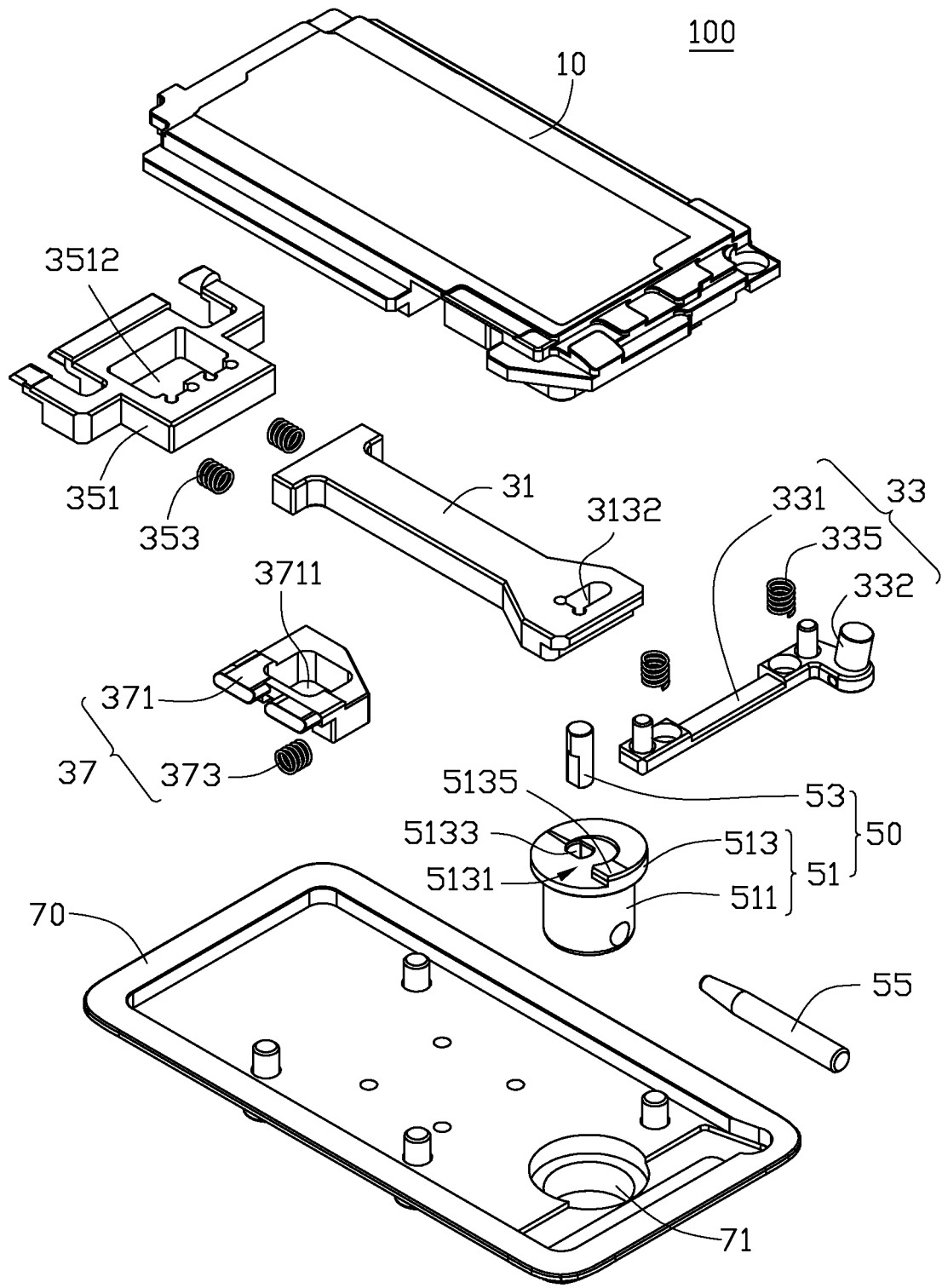
FIG. 3 is similar to FIG. 2, but viewed from another aspect.

FIGS. 2 and 3 show that the clamping device 100 can include a supporting seat 10, a clamping assembly 30, an operation assembly 50, and a pressing plate 70. The clamping assembly 30 and the operation assembly 50 can be movably assembled to the supporting seat 10. The pressing plate 70 can be secured to the supporting seat 10 and slidably sleeved on the operation assembly 50. The operation assembly 50 can be configured for pushing the clamping assembly 30 into the protection holes.

The supporting seat 10 is substantially rectangular, and define an L-shaped sliding groove 11, a first receiving groove 17, a second receiving groove 18, and a receiving hole 171. The L-shaped sliding groove 11 can be defined on a substantially middle portion of the supporting seat 10, and can include a first groove 13 arranged along an X-axis direction and a second groove 15 extending from an end of the first groove 13 perpendicularly. The second groove 15 can be arranged along a Y-axis direction. The first receiving groove 17 and the second receiving groove 18 can be located at opposite ends of the supporting seat 10, and communicate with opposite ends of the first groove 13, respectively. The receiving hole 171 can be defined at a bottom of the receiving groove 17 and can be a through hole. The second receiving groove 18 can be perpendicular to the first groove 13. The supporting seat 10 can further include a blocking portion 151 in the L-shaped sliding groove 11, and a protrusion portion 181 in the second receiving groove 18. The blocking portion 151 can be located on a bottom of an end of the second groove 15 away from the first groove 13. The protrusion portion 181 can be located at a bottom of a side of the second receiving groove 18 adjacent to the first groove 13.

The clamping assembly 30 can be movably mounted on the supporting seat 10, and include a pushing member 31, a first clamping subassembly 33, a second clamping subassembly 35, and a third clamping subassembly 37.

Figure 4:
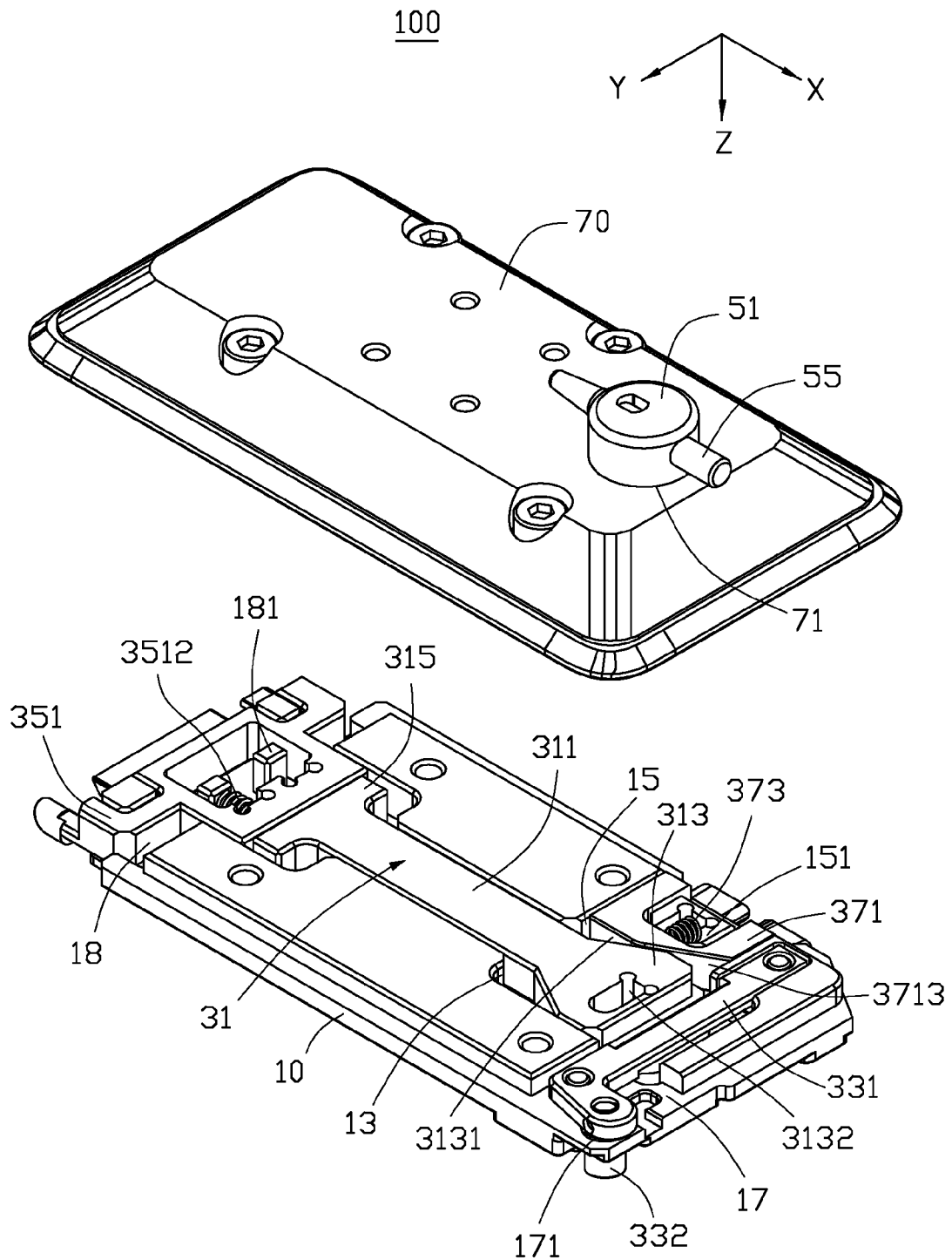
FIG. 4 is a partially disassembled, isometric view of the clamping device of FIG. 1.

FIG. 4 illustrates that the pushing member 31 can be substantially "I" shaped, and slidably received in the first groove 13 along the X-axis direction. The pushing member 31 includes a main body 311, a pushing portion 313, and a resisting portion 315. The pushing portion 313 and the resisting portion 315 are respectively protruding from opposite ends of the main body 311. The pushing portion 313 can be substantially trapezoid shaped, and located at an end of the first groove 13 adjacent to the second groove 15. The pushing portion 313 can define an inserting hole 3132 in a middle and a pair of pushing surfaces 3131 at opposite sides. One pushing surface 3131 is located adjacent to the second groove 15.

The first clamping subassembly 33 can be received in the first receiving groove 17 and movable along a Z-axis direction. The first clamping subassembly 33 can include a pressing rod 331, a first latching member 332, and a plurality of first elastic members 335. The pressing rod 331 can be substantially in an L-shape, and movably received in the first receiving groove 17. The pressing rod 331 can include a base body 3312 and a mounting portion 3313 perpendicularly extending from an end of the base body 3312. The base body 3312 can be received in the first receiving groove 17, the mounting portion 3313 can be aligned with the receiving hole 171. The first latching member 332 can be secured to an end of the mounting portion 3313 away from the base body 3312, and can be partially, slidably received in the receiving hole 171. The plurality of first elastic members 335 can be resisted between the base body 3312 and the bottom of the first receiving groove 17.

The second clamping subassembly 35 can be received in the second receiving groove 18, and resists the resisting portion 315 of the pushing member 31. The second clamping subassembly 35 can be slidable along the X-axis direction, and include a second latching member 351 and a plurality of second elastic members 352. The second latching member 351 can define a first through hole 3512 in a middle. The first through hole 3512 can have a size greater than that of the protrusion portion 181, and the protrusion portion 181 can be received in the first through hole 3512 to enable the second latching member 351 to slide along the X-axis direction. The plurality of second elastic members 352 can be resisted between the protrusion portion 181 and an inner side of the first through hole 3512, thereby resisting the second latching member 351 toward the pushing member 31.

The third clamping subassembly 37 can be received in the second groove 15, and resist the pushing surface 3131 of the pushing member 31. The third clamping subassembly 37 can be capable of moving along the Y-axis direction, and can include a third latching member 371 and at least one third elastic member 373. The third latching member 371 can be substantially trapezoid, and define a second through hole 3711 in a middle and a resisting surface 3713 corresponding to the pushing surface 3131 of the pushing member 31. The second through hole 3711 can have a size greater than that of the blocking portion 151 of the supporting seat 10, and the blocking portion 151 can be received in the second through hole 3711 to enable the third latching member 371 to slide along the X-axis direction. The at least one third elastic member 373 can be resisted between the blocking portion 151 and an inner side of the second through hole 3711, thereby resisting the third latching member 371 in the direction of the pushing member 31.

Figure 5:
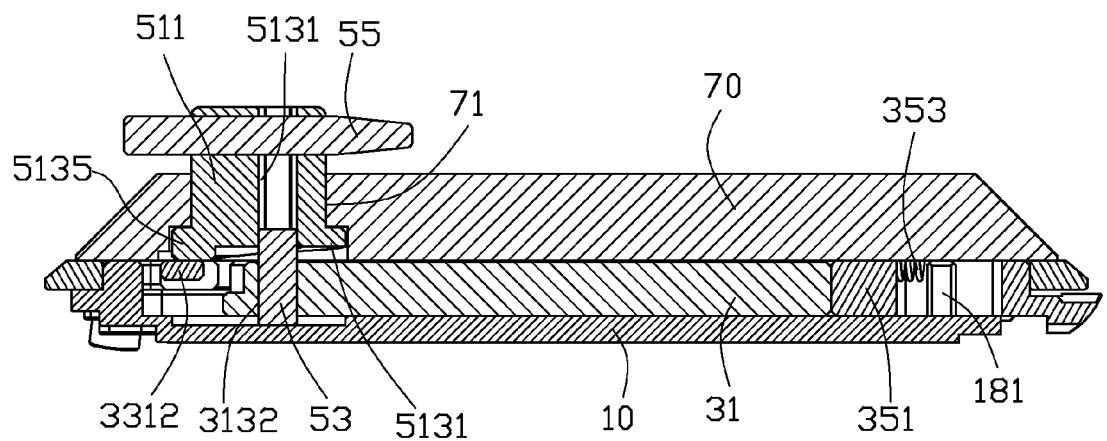
FIG. 5 is a sectional view of the clamping device of FIG. 1, taken along line V-V.

FIGS. 3 through 5 show that the operation assembly 50 can be assembled to the pushing member 31 and partially press upon the pressing rod 331 of the first clamping subassembly 33. The pushing subassembly 50 can include a locking member 51 and a transmission pin 53. The locking member 51 can be a substantially stepped cylindrical shape, and can include an operation portion 511 and a locking portion 513 coaxially protruding from an end of the operation portion 511. The operation portion 511 can be located above the insertion hole 3132 of the pushing member 31. The locking portion 513 can define an abutting surface 5131 at an end away from the operation portion 511 and a mounting hole 5133 on the abutting surface 5131, and forms a spiral protrusion 5135 (see FIG. 3) along a periphery of the abutting surface 5131. The abutting surface 5131 can partially resist the base body 3312 of the pressing rod 331. The mounting hole 5133 can be eccentric to the locking portion 513. In the embodiment, a height of the spiral protrusion 5135 increases along an anti-clockwise direction. The transmission pin 53 can be securely assembled in the mounting hole 5133, and protrude into the inserting hole 3132 of the pushing member 31. When rotating the locking member 51, the transmission pin 53 can be driven to resist the inner side of the inserting hole 3132, thereby resisting the pushing member 31 toward the second latching member 351. At the same time, the resisting portion 315 of the pushing member 31 can push the second latching member 351 to partially expose out of the supporting seat 10 along the X-axis direction. The pushing surface 3131 of the pushing member 31 can push the third latching member 371 to partially expose out of the supporting seat 10 along the Y-axis direction. The second latching member 351 and the third latching member 371 can be partially latched into the protection holes of the workpeice. At the same time, the abutting surface 5131 can rotate relative to the pressing rod 331, and the spiral protrusion 5135 gradually resists the pressing rod 331 to move along the Z-axis direction. The pressing rod 331 can drive the first latching member 332 to partially expose out of the supporting seat 10. The first latching member 332 can be latched into protection holes of the workpiece.

The pressing plate 70 can be substantially rectangular shaped and securely stacked upon the supporting seat 10 to receive the clamping assembly 30 between the supporting seat 10 and the pressing plate 70. The pressing plate 70 can define a containing hole 71. The operation portion 511 of the locking member 51 can rotatably extend through the containing hole 71 and partially extends out of the pressing plate 70. In the embodiment, a knob 55 extends through the operation portion 511 radially and is located above the pressing plate 70. The knob 55 is configured for conveniently rotating the locking member 51.

When in assembly, the pushing member 31 can be received in the first groove 13 of the supporting seat 10 and can be arranged along the X-axis direction. The first clamping subassembly 33 can be received in the first receiving groove 17, and movable along the Z-axis direction. The first latching member 332 can be partially received in the receiving hole 171. The second clamping subassembly 33 can be received in the second receiving groove 18 and movable along the X-axis direction. The second clamping subassembly 33 can resist the pushing member 31. The third clamping subassembly 37 can be received in the second groove 15 and movable along Y-axis direction. The third clamping subassembly 37 can resist the pushing surface 3131. The abutting surface 5131 can partially resist the base body 3312 of the first clamping subassembly 33. The transmission pin 53 can be securely received in the mounting hole 5133 and is partially received in the inserting hole 3132 of the pushing member 31. The pressing plate 70 can be slidably sleeved on the operation portion 511 of the locking member 51 and can be secured to the supporting seat 10.

When in use, the workpiece is sleeved on the supporting seat 10, the protection holes of the workpiece is respectively aligned with the first latching member 332, the second latching member 351, and the third latching member 371. The knob 55 can be rotated along clockwise direction, thus the transmission pin 53 can be rotated eccentrically to push the pushing member 31 along the X-axis direction, thereby resisting the second latching member 351 to move along the X-axis direction, and the third latching member 371 to move along the Y-axis direction. The second latching member 351 and the third latching member 371 can protrude out of the supporting seat 10 and latch into corresponding protection holes. At the same time, the resisting surface 5131 can rotate relative to the pressing rod 331, the spiral protrusion 5135 can resist the pressing rod 331 to drive the first latching member 332 along the Z-axis direction. The first latching member 332 can protrude out of the supporting seat 10 and latch into corresponding protection holes of the supporting seat 10. The clamping device 100 can hold the workpiece stable.

When disassembling the clamping device from the workpiece, the knob 55 is rotated along anti-clockwise direction, thus the transmission pin 53 is rotated eccentrically to allow the pushing member 31 moving along the X-axis direction, thereby releasing the second latching member 351 and the third latching member 371. The second latching member 351 and the third latching member 371 is withdrawn and received in the supporting seat 10 from the exertion of the second elastic members 352 and the third elastic members 373. At the same time, the resisting surface 5131 rotates relative to the pressing rod 331, the spiral protrusion 5135 withdraws into the supporting seat 10 allowing the first latching member 332 to move along the Z-axis direction.

In the clamping device 100, the operation assembly 50 includes a locking member 51 and a transmission pin 53. The resisting surface 5131 of the locking member 51 resists the pressing rod 331 of the first clamping subassembly 33. The transmission pin 53 is eccentrically mounted on the locking member 51 and is partially received in the inserting hole 3132 of the pushing member 31. When the transmission pin 53 is rotated eccentrically, the resisting surface 5131 rotates relative to the pressing rod 331, the spiral protrusion 5135 resists the pressing rod 331 driving the first latching member 332 to latch into corresponding protection holes of the supporting seat 10. At the same time, the transmission pin 53 pushes the pushing member 31 in the X-axis direction, thereby resisting the second latching member 351 in the X-axis direction and the third latching member 371 in the Y-axis direction. The second latching member 351 and the third latching member 371 protrude from the supporting seat 10 and latch into corresponding protection holes. Thereby, the clamping device 100 can stably hold the workpiece. When disassembling, the locking member 51 can be rotated anti-clockwise, the first latching member 332, the second latching member 351, and the third latching member 371 withdraw automatically to release the workpiece. In the assembly and disassembly procedure, an operation of the pressing plate 70 is omitted, the assembly and disassembly procedure is convenient, and efficiency is greatly enhanced.

One or two of the first clamping subassembly 33, the second clamping subassembly 35, and the third clamping subassembly 37 can be omitted, and more than three clamping subassemblies (including clamping subassemblies mentioned above) can be employed in the clamping device 100. When the third clamping subassembly 37 is omitted, the second groove 15 can be omitted. The knob 55 can also be omitted. The pushing member 31 and the second latching member 351 can be integrally formed. When the second clamping subassembly 35 has a structure the same as the first clamping subassembly 33, the spiral protrusion 5135 of the locking member 51 can be defined into two parts each resisting one of the second clamping subassembly 35 and the first clamping subassembly 33, and the transmission pin 53 resists the third latching member 371 of the third clamping subassembly 37.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A clamping device for clamping a workpiece defining at least two protection holes, comprising:
   a supporting seat defining a sliding groove, a first receiving groove, a second receiving groove, and a receiving hole, and the supporting seat comprising a protrusion portion, the sliding groove being defined at a middle of the supporting seat, the first receiving groove and the second receiving groove being located at opposite ends of the supporting seat and communicating with the sliding groove, the receiving hole being defined at a bottom of the first receiving groove, and the protrusion portion being located at a bottom of the second receiving groove;
   a pressing plate securely stacked upon the supporting seat;
   a clamping assembly located between the supporting seat and the pressing plate, and the clamping assembly comprises:
      a first clamping subassembly comprising a pressing rod, a first latching member, and at least one first elastic member, the pressing rod being slidably received in the first receiving groove, the first latching member being secured to the pressing rod and partially received in the receiving hole, the at least one first elastic member being resisted between the bottom of the first resisting groove and the pressing rod;
      a second clamping subassembly comprising a second latching member and at least one second elastic member, the second latching member being received in the second receiving groove and slidably sleeved on the protrusion portion, the at least one second elastic member being resisted between the second latching member and the protrusion portion; and
      a pushing member slidably received in the sliding groove and resisting the second latching member; and
   an operation assembly comprising a locking member and a transmission pin eccentrically assembled to an end of the locking member, wherein the locking member extends through the pressing plate, and defines an abutting surface at an end away from the pressing plate, and forms a spiral protrusion along a periphery of the abutting surface, the abutting surface partially resists the pressing rod, a height of the spiral protrusion increases along anti-clockwise or clockwise directions, the transmission pin resists the pushing member, when the locking member is rotated, the transmission pin is driven to resist the pushing member toward the second latching member, thereby pushing the second latching member to be partially exposed from the supporting seat, simultaneously, the spiral protrusion resists the pressing rod to drive the first latching member to be partially exposed from the supporting seat, such that the first latching member and the second latching member latch into the at least two protection holes correspondingly to clamp the workpiece.

2. The clamping device of claim 1, wherein the pressing rod comprises a base body and a mounting portion perpendicularly extending from an end of the base body, the base body is received in the first receiving groove, the mounting portion is aligned to the receiving hole, the first latching member is secured to an end of the mounting portion away from the base body, and partially received in the receiving hole, the at least one first elastic member is resisted between the base body and the bottom of the first receiving groove.

3. The clamping device of claim 1, wherein the second latching member defines a first through hole in a middle thereof, the protrusion portion is slidably received in the first through hole, the at least one second elastic member is resisted between the protrusion portion and an inner side of the first through hole, thereby resisting the second latching member toward the pushing member.

4. The clamping device of claim 1, wherein the pushing member comprises a main body, a pushing portion, and a resisting portion, the pushing portion and the resisting portion respectively protrude from opposite ends of the main body, the pushing portion defines an inserting hole thereon, the transmission pin is received and resisted in the inserting hole, the resisting portion resists the second latching member.

5. The clamping device of claim 4, wherein the sliding groove comprises a first groove and a second groove extending from an end of the first groove perpendicularly, the first receiving groove and the second receiving groove communicate with opposite ends of the first groove, the supporting seat further comprises a blocking portion in the second groove, the clamping assembly further comprise a third clamping subassembly movably sleeved on the blocking portion, the third clamping subassembly is resisted by the pushing portion of the pushing member to latch into the workpiece.

6. The clamping device of claim 5, wherein the third clamping subassembly comprises a third latching member and at least one third elastic member, the third latching member defines a second through hole, the blocking portion is received in the second through hole, the at least one third elastic member is resisted between the blocking portion and an inner side of the second through holes, thereby resisting the third latching member toward the pushing portion of the pushing member.

7. The clamping device of claim 6, wherein the pushing portion of the pushing member defines a pushing surface at a side facing the third latching member, the third latching member defines a resisting surface at a side resisting the pushing surface.

8. The clamping device of claim 1, wherein the pressing plate defines a containing hole thereon, the locking member comprises an operation portion and a locking portion coaxially protruding from an end of the operation portion, the operation portion extends through the containing hole and partially exposes out of the pressing plate, the locking portion is located above the pushing member, the abutting surface and the spiral protrusion are formed on the locking portion.

9. The clamping device of claim 8, wherein the operation assembly further comprises a knob extending through the operation portion radially, the knob being located above the pressing plate.

10. A clamping device comprising:
a supporting seat defining a sliding groove, a first receiving groove, a second receiving groove, and the supporting seat comprising a protrusion portion, the sliding groove being defined at a middle of the supporting seat, the first receiving groove and the second receiving groove being located at opposite ends of the supporting seat and communicating with the sliding groove, and the protrusion portion being located at a bottom of the second receiving groove;
a pressing plate securely stacked upon the supporting seat;
a clamping assembly located between the supporting seat and the pressing plate, the clamping comprising:
a first clamping subassembly comprising a pressing rod and a first latching member, the pressing rod being slidably received in the first receiving groove, the first latching member being secured to the pressing rod;
a second clamping subassembly received in the second receiving groove and slidably sleeved on the protrusion portion; and
a pushing member slidably received in the sliding groove and comprising a pushing portion and a resisting portion at opposite ends, the pushing portion resisting the second latching member; and
an operation assembly comprising a locking member and a transmission pin eccentrically assembled to an end of the locking member, wherein the locking member extends through the pressing plate, and defines an abutting surface at an end away from the pressing plate, and forms a spiral protrusion along a periphery of the abutting surface, the abutting surface partially resists the pressing rod, a height of the spiral protrusion increases along anti-clockwise or clockwise directions, the transmission pin resists the resisting portion of the pushing member, when the locking member is rotated, the transmission pin is driven to resist the pushing member toward the second latching member, thereby pushing the second latching member to be partially exposed from the supporting seat, simultaneously, the spiral protrusion resists the pressing rod to drive the first latching member to be partially exposed from the supporting seat.

11. The clamping device of claim 10, wherein the supporting seat further defines a receiving hole on a bottom of the first receiving groove, the pressing rod comprises a base body and a mounting portion perpendicularly extending from an end of the base body, the base body is received in the first receiving groove, the mounting portion is aligned to the receiving hole, the first latching member is secured to an end of the mounting portion away from the base body, and partially received in the receiving hole, the first clamping subassembly further comprises at least one first elastic member, the at least one first elastic member is resisted between the base body and the bottom of the first receiving groove.

12. The clamping device of claim 10, wherein the second latching member defines a first through hole in a middle, the protrusion portion is slidably received in the first through hole, the second clamping subassembly further comprises at least one second elastic member resisted between the protrusion portion and an inner side of the first through hole, the at least one second elastic member resists the second latching member toward the pushing member.

13. The clamping device of claim 10, wherein the pushing member further comprises a main body, the pushing portion and the resisting portion respectively protrude from opposite ends of the main body, the pushing portion defines an inserting hole thereon, the transmission pin is received and resisted in the inserting hole.

14. The clamping device of claim 13, wherein the sliding groove comprises a first groove and a second groove extending from an end of the first groove perpendicularly, the first receiving groove and the second receiving groove communicate with opposite ends of the first groove, the supporting seat further comprises a blocking portion in the second groove, and the clamping assembly further comprises a third clamping subassembly movably sleeved on the blocking portion, the third clamping subassembly is resisted by the pushing portion of the pushing member to partially expose out of the supporting seat.

15. The clamping device of claim 14, wherein the third clamping subassembly comprises a third latching member and at least one third elastic member, the third latching member defines a second through hole, the blocking portion is received in the second through hole, the at least one third elastic member is resisted between the blocking portion and an inner side of the second through hole, thereby resisting the third latching member toward the pushing portion of the pushing member.

16. The clamping device of claim 15, wherein the pushing portion of the pushing member defines a pushing surface at a side facing the third latching member, the third latching member defines a resisting surface at a side resisting the pushing surface.

17. The clamping device of claim 10, wherein the pressing plate defines a containing hole thereon, the locking member comprises an operation portion and a locking portion coaxially protruding from an end of the operation portion, the operation portion extends through the containing hole and partially expose out of the pressing plate, the locking portion is located above the pushing member, the abutting surface and the spiral protrusion are formed on the locking portion.

18. The clamping device of claim 17, wherein the operation assembly further comprises a knob extending through the operation portion radially, the knob being located above the pressing plate.

19. A clamping device for clamping a workpiece defining at least two protection holes, comprising:
   a supporting seat defining a sliding groove, a first receiving groove, a second receiving groove, the sliding groove being defined at a middle of the supporting seat, the first receiving groove and the second receiving groove being located at opposite ends of the supporting seat and communicating with the sliding groove;
   a pressing plate securely stacked upon the supporting seat;
   a clamping assembly located between the supporting seat and the pressing plate, the clamping assembly comprising:
      a first clamping subassembly received in the first receiving groove;
      a second clamping subassembly received in the second receiving groove,
      a pushing member slidably received in the sliding groove and resisting the second clamping subassembly; and
   an operation assembly comprising a locking member and a transmission pin eccentrically assembled to an end of the locking member, wherein the locking member extends through the pressing plate, and defines an abutting surface at an end away from the pressing plate, and forms a spiral protrusion along a periphery of the abutting surface, the abutting surface partially resists the pressing rod, a height of the spiral protrusion increases along anti-clockwise or clockwise directions, the transmission pin resists the pushing member, when the locking member is rotated, the transmission pin is driven to resist the pushing member toward the second latching member, thereby pushing the second clamping subassembly to move in a first direction, and partially expose out of the supporting seat, simultaneously, the spiral protrusion resists the first clamping subassembly to move in a second direction perpendicular to the first direction, and be partially exposed from the supporting seat, such that the first latching member and the second latching member latch into the at least two protection holes correspondingly to clamp the workpiece.

\* \* \* \* \*